United States Patent Office 3,458,348
Patented July 29, 1969

3,458,348
TRANSPARENT COATED OPTICAL ELEMENT
Patsy O. Sherman, Bloomington, Minn., assignor to Minnesota Mining and Manufacturing Company, St. Paul, Minn., a corporation of Delaware
Filed May 31, 1966, Ser. No. 553,882
Int. Cl. G02b 1/10
U.S. Cl. 117—138.8                   13 Claims

ABSTRACT OF THE DISCLOSURE

An optical element wherein the optical deformities of conventional optical elements are eliminated by the provision of a coating of a transparent thermoset acrylic polymer containing sufficient fluorine atoms to produce in such polymer an index of refraction which is about that of said optical element.

---

This invention relates to new and useful thermoset copolymer coated optical elements, and to methods for making and using the same.

In the art of fabricating optical elements (that is, photon energy transmissive solid bodies, such as lenses, windows, view apertures, etc.), the conventional procedure is first to mold a solid thermoplastic base from a thermoplastic starting material and then to polish and otherwise mechanically treat such solid base so as to provide the desired surfaces on the product optical elements.

Several problems are commonly associated with such fabrication. The base structure should be shock resistant, rigid but capable of being readily extruded or molded, while the surfaces of such base structure should be hard and capable of taking and holding a high polish. Such a combination of properties is difficult to find, especially in transparent organic plastic materials. Mold marks, extrusion lines and other surface optical defects are commonly generated during manufacturing processes, while during use, surfaces commonly become environmentally abraded, attacked by corrosive materials, and the like. The most desirable compositions for optical elements from a structural viewpoint are seldom those having optical surfaces which are best suited for resisting environmental attack.

In order to overcome such prior art shortcomings in optical elements and to produce improved coated optical elements, there is provided by the present invention an optical element which comprises a preformed base of transparent, solid material having at least one light transmissive surface of the aforesaid optimum base properties coated with a thin layer of a transparent copolymer having an index of refraction approximating that of such base and having the aforesaid optimum surface properties. The resulting coated optical element not only has surface imperfections eliminated from so coated surfaces of the preformed base, but also has the capacity to undergo, as needed or desired, subsequent mechanical surface finishing and polishing operations. Additionally, such coated optical element displays broad spectrum resistance to various forms of environmental attack, as by abrasives, solvents, chemicals, including enzymes, corrosive gases or liquids and the like.

An object of this invention is to provide coated optical elements.

Another object of this invention is to provide means for eliminating surface imperfections in coated optical elements, especially plastic lens bodies.

Another object of this invention is to provide methods and means for improving the surface characteristics of coated optical elements, including surface hardness, resistance to chemical attack and abrasion, and the like.

Other and further objects will become apparent to those skilled in the art from a reading of the present specification, taken together with the drawings wherein.

Figure 1:
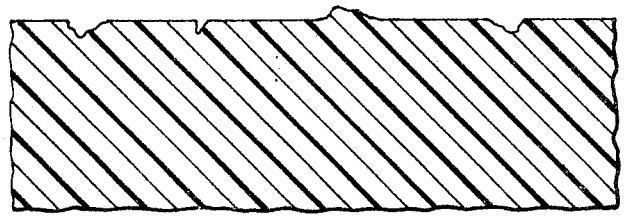
FIGURE 1 is a vertical sectional diagrammatic view through one portion of a base or substrate plastic lens body ready for coating with a monomer mixture in accordance with the teachings of this invention.

This invention relates to a light transmitting article of manufacture, especially one which is lenticularly surfaced, in which at least one light transmitting surface of a base optical element is coated with a layer of transparent thermoset organic polymer containing sufficient substituted fluorine on the carbon atoms to produce in such polymer an index of refraction approximately matching that of the surface to be coated.

Transparent solid bases used in the optical elements of this invention are preformed and can be of conventional manufacture and so are not described in detail herein. In general, inorganic glasses or transparent organic thermoplastic solid materials can be used to form the base optical element in this invention. For example, the production of organic thermoplastic base lens elements is described in reference books, such as Chapter II of "Fabrication and Processing Polymers and Resins" by Golding published by D. Van Nostrand, Princeton, N.J., 1959. Many commonly available transparent thermoplastic organic polymers useable for base optical elements characteristically have refractive indices ranging from about 1.46 to 1.50.

The term "transparent" as used herein has reference to a composition which transmits at least 85% of perpendicular incident visible light through an optical path of 1 mil (.0025 cm.).

The term "refractive index" as used herein has reference to the standard conventional measurement of refractive index at the D-line of sodium (approximately 5890° A.) at a temperature of about 20° C. It will be appreciated, however, that the refractive index of an optical element will vary according to the frequency of incident light thereupon. For purposes of disclosure and illustration herein, an adequate optical match between, for example, a preformed base and a thermoset fluorinated acrylic copolymer coating thereon can be considered to have been obtained when the respective refractive indices of such base and such copolymer at the D-line approximately coincide. In general, it is preferred that the index of refraction of the fluorine-containing polymer layer or coating be within .02 refractive index units of the preformed base.

The coating of the polymer on the surface of the transparent base optical element is obtained by forming the polymer in situ on that surface by polymerization of a fluorine-containing monomer thereon. Preferably the treatment of the base surface is achieved by polymerizing a single phase liquid mixture containing a fluorine-free acrylic monomer and a fluorine-containing acrylic monomer. This acrylic polymer formed from such mixture on such surface must not only have (1) a refractive index which approximates that of the base optical element, but also must be (2) transparent and (3) thermoset. The term "acrylic" as used herein includes both acrylate and methacrylate esters, monomeric and polymeric.

The required refractive index of the ultimate polymer surface is controlled by the amount and degree of fluorination of the fluorine-containing monomer in the monomer mixture, as hereinafter more fully taught.

Transparency is achieved in a coating by using a mixture of acrylic monomers such that, at the time of polymerization, the mixture is liquid and the component monomers are mutually soluble in one another (single phase) and have relative reactivity ratios such that a single phase solid polymeric product is produced.

The desired thermoset character is achieved by having at least one of the monomers in the monomer mixture polyfunctional, e.g., containing more than one group capable of polymerizing. Such polyfunctional monomer may be either a fluorine-containing acrylic monomer or a fluorine-free acrylic monomer or both. The proportion of polyfunctional monomer(s) in the mixture depends upon the thermoset properties desired in the resulting polymer. Usually a suitable acrylic monomer mixture contains from about 15 to 90 mol percent of polyfunctional monomer(s). It will be appreciated that various mixtures of fluorine-free acrylic monomers and fluorine-containing acrylic monomers may be employed in the practice of the present invention. Usually it is preferred to employ such monomer mixtures which are clear liquids at room temperature or are low melting solids.

The acrylic monomers used in this invention may be represented in a preferred form by the following typical formula (1)
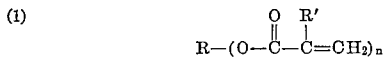

where

R is an organic radical of $n$ valence,
R' is hydrogen or a lower alkyl radical, preferably methyl, and
$n$ is an integer of at least 1 usually less than 5.

In the Formula 1 R can contain a divalent linking moiety such as $-SO_2-$, $-O-$, $-SO_2NR''-$, $-CO-$, $-CONR''-$, and the like, wherein R'' is hydrogen or an alkyl group containing less than about 6 carbon atoms. The precise structure of the acrylic monomer is not a critical part of this invention, and a wide variety of structural variations may be used for particular purposes.

While in either the fluorine-free acrylic monomers or in the fluorine-containing acrylic monomers there can be one or two chlorine atoms per molecule, it is much preferred that the acrylic monomers be free of other halogen atoms (e.g. chlorine, bromine and iodine).

In fluorine-free acrylic monomers of Formula 1 R is preferably a halogen-free aliphatic radical containing at most oxygen bonded to two carbon atoms in the chain. Examples of fluorine-free monofunctional acrylic monomers include methyl acrylate
propyl acrylate
beta propoxy propyl acrylate
methyl methacrylate
propyl methacrylate
beta propoxy propyl methacrylate and the like. Examples of fluorine-free polyfunctional acrylic monomers include ethylene glycol dimethacrylate
diethylene glycol dimethacrylate
diethylene glycol diacrylate
triethylene glycol dimethacrylate
tetraethylene glycol dimethacrylate
dipropylene glycol dimethacrylate
dipropylene glycol diacrylate
tetramethylene glycol dimethacrylate
hexamethylene glycol dimethacrylate
trimethylolpropane trimethacrylate
trimethylolpropane triacrylate
pentaerythritol tetramethacrylate and the like.

In fluorine-containing acrylic monomers of Formula 1 R is an organic radical containing fluorine substituted for hydrogen on the carbon atom and is preferably a radical which contains a terminal perfluoroalkyl group containing less than 12 carbon atoms. Examples of monofunctional fluoroaliphatic radical containing acrylic monomers suitable for use in the present invention include:

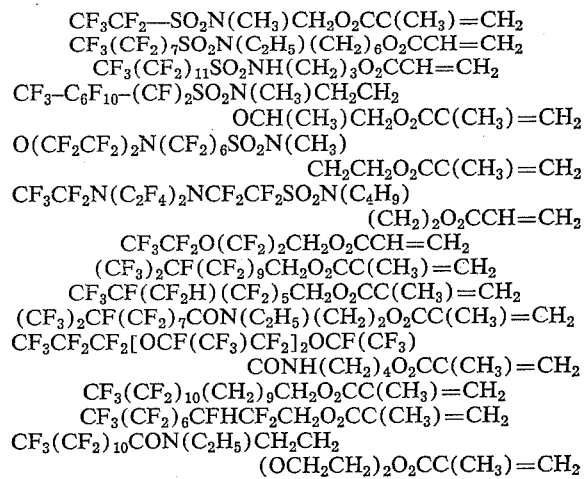

and the like.

Examples of polyfunctional fluoroaliphatic radical containing acrylic monomers suitable for use in this invention include $[-CF_2CF_2CH_2O_2CC(CH_3)=CH_2]_2$

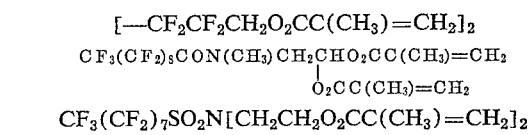

$CF_3(CF_2)_7SO_2N[CH_2CH_2O_2CC(CH_3)=CH_2]_2$ and the like.

One convenient method for preparing a polymerizable liquid mixture of the acrylic monomers involves the dissolution of a fluorine-containing acrylic monomer in a fluorine-free acrylic monomer.

Polymerization of acrylic monomers, as thse familiar with the art will appreciate, is conveniently initiated by any one or more of plurality of techniques, including application of energy, such as heat, ultraviolet light, or the like, or incorporation of a small amount (e.g. generally less than 1 weight percent of total liquid mixture) of a free radical initiator such as an organic peroxide, an azo compound (e.g. azobisisobutyronitrile), or the like in the liquid mixture to be coated. In the case of ultraviolet light, use of conventional photosensitizers such as benzoin may be desirable to increase the efficiency of polymerization. Similarly, in the use of free radical initiators, the use of promotors, such as tertiary amines, may be desirable to increase the rate of polymerization at relatively low temperatures.

Preferably such mixture contains substantially no other components besides the fluorine free and the fluorine-containing acrylic monomers except (possibly) for polymerization initiators (depending on how polymerization is to be initiated). While appropriate solvents can be used, for example, to decrease viscosity of a monomer mixture, it is difficult to remove the solvent without developing irregularities in the polymer layer made from such a solvent-containing mixture; it is, therefore, preferred to coat without the use of solvents, and to obtain the desired fluidity or compatability in a mixture to be coated by increasing the temperature of the mixture and by using a polymerization initiator of relatively low reactivity, such as tertiary butyl hydroperoxide, or the like.

As indicated above, the index of refraction in a transparent thermoplastic organic polymer suitable for use as a base element in this invention typically may vary from about 1.46 to 1.50. Therefore, a thermoset coating on such a base element is likewise chosen so as to have an index of refraction within this range, the exact index of refraction for any given coating being dependent upon the specific base element. The fluorine-free monomer suitable for use in this invention, and particularly the preferred fluorine-free acrylic monomer, typically varies in refractive index from about 1.49 to 1.52. When such fluorine-free monomer is polymerized, the specific refraction of the composition decreases, due to the loss of double bonds, and the density of the polymer becomes greater than the density of the monomer, usually resulting in a net increase in refractive index. Although the extent of this increase varies with the particular monomer used, it is generally found to be about 0.02 to 0.08 refractive index units. Similarly, the fluorine-containing monomer useful in this invention, and particularly the preferred fluorine-containing acrylic monomer, typically has an index of refraction ranging from about 1.30 to 1.42. As in the case of a fluorine-free monomer (above), polymerization of a fluorine-containing monomer results in a polymer with a generally higher index of refraction, but in this situation, the increase has been found to be about 0.01 to 0.03 units. The exact increase in refractive index resulting from polymerization of a monomer mixture cannot be precisely calculated, but it can be approximated from a knowledge of the refractive index of the homopolymer corresponding to each particular monomer used in the monomer mixture. This relationship is hereinafter more particularly described. In general, in selecting monomers for a mixture, it is convenient to use the refractive index of each monomer employed and make an allowance for an assumed increase of about 0.03 refractive index units during a subsequent polymerization.

It is possible, as by a suitable balance of fluoroalkyl and fluorine-free alkyl or alkylene groups, to devise a monomer which can polymerize to a transparent solid thermoset polymer of any desired refractive index. It would be, however, much simpler, generally more economical, and allow a greater flexibility if matching of refractive index could be achieved by simple blending or mixing of readily available monomers of higher and lower refractive index to arrive at the desired intermediate refractive index. Such a monomer mixture is provided by this invention.

From the knowledge that a given base has a certain index of refraction, one can use the following approximate relationship in preparing the polymerizable acrylic monomer mixture: The volume fraction of the fluorine-containing monomer(s) times the refractive index of its homopolymer, plus the volume fraction of fluorine free acrylic monomer(s) times the refractive index of its homopolymer is chosen so as to substantially equal the index of refraction of the preformed base. This relationship is expressed by the following equation:

(2) $\quad X(n_{Fp}) + (1-X)(n_{Rp}) = n_{Cp}$ where $n_{Fp}$ is the refractive index of the homopolymer made from a fluorine-containing monomer, X is its volume fraction in a monomer mixture of the invention, $n_{Rp}$ is the refractive index of the homopolymer made from a fluorine-free acrylic monomer, and $n_{Cp}$ is the refractive index of the preformed base optical element.

If more than two monomers are involved in the monomer mixture, then a corresponding term is required in Equation 2 for each additional monomer.

When, for example, the base is an organic plastic material having an index of refraction ranging from about 1.46 to 1.50, the acrylic monomer mixture has an index of refraction in the range of from about 1.42 to 1.47, the exact index for any given mixture within this range being selected in accordance with Equation 2 so that the polymer resulting after polymerization of the liquid mixture approximates that of the associated underlying base optical element.

Polymerizable liquid monomer mixtures used in this invention are particularly unusual because, as those skilled in the art will appreciate, characteristically monomers of different classes are not miscible or soluble in one another in sufficient amounts to give a compatible polymerizable liquid mixture which, when polymerized, produces thermoset, transparent solid polymer structures having a desired refractive index. Usually and characteristically a mixture of monomers produces on polymerization a cloudy polymer, either because the monomer mixture contains incompatible components, or because during polymerization the reactivity of the individual monomers of the mixture are such that a single phase homogeneous product polymer inherently cannot result.

In these polymerizable liquid monomer mixtures, using a fluoroaliphatic radical containing monomer, in general, the higher the fluorine content is, the lower is the refractive index of the associated monomer, and the less is its solubility in the first class of starting materials. However, the lower the refractive index of a fluorine-containing monomer, the less is required thereof to obtain a specific desired decrease in the refractive index of the final liquid polymer mixture.

In general, monofunctional acrylate polymers and copolymers tend to be shock resistant and relatively soft materials, while methacrylate polymers and copolymers tend to be harder and more brittle by comparison. For coating applications in which maximum resistance to abrasion or scratching is required, or in which mechanical polishing of coated surfaces is necessary, the methacrylate polymers are preferred. Accordingly, in this invention, it is usually preferred either to copolymerize a liquid mixture of fluorine-free acrylate esters with fluorine-containing acrylate esters, or to copolymerize a liquid mixture of fluorine-free methacrylate esters with fluorine-containing methacrylate esters, because of the desirability of copolymerizing monomers of comparable relative reactivity ratios.

These polymerizable liquid acrylic monomer mixtures are first coated upon base optical elements and then polymerized in place to produce the coated optical elements of this invention. When it is desired to coat a preformed base with such a polymerizable liquid mixture, any convenient or conventional coating procedure can be used, such as spraying, dipping, knife coating, curtain coating, or the like. During the coating operation, the liquid mixture and the substrate being coated are preferably maintained in a substantially oxygen-free environment so as to avoid inhibition of polymerization of the liquid mixture. It is not necessary that a mixture be in a liquid state except at the time when it is coated upon a base optical element so that, for example, coating of a low melting solid mixture can be accomplished using elevated temperatures so long as the temperature used is below the boiling point of the lower boiling monomer in such mixture.

The thickness of a layer of such a liquid mixture which is deposited upon a surface of a preformed base to be coated can vary widely, depending upon the method of coating, the surface roughness of the substrate to be coated and the general requirements of the specific application. Polymerized coating layer thicknesses vary but range commonly and conveniently from about 0.01 to 100 mils in average thickness, the thickness in any given coated optical element being determined by the end results desired. The coatings can be colored by a dye, as those skilled in the art of coloring plastic materials will appreciate.

After the coating operation has been completed and the liquid monomer mixture has been copolymerized to a thermoset solid copolymer, one can further process the resulting composite structure by conventional grinding and polishing.

Figure 2:
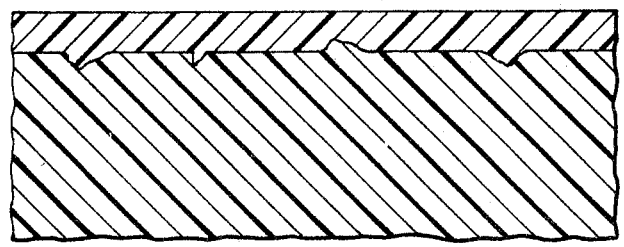
FIGURE 2 is a diagrammatic view similar to FIGURE 1 but wherein the upper face of such base element has been coated with a layer of copolymer material as taught by this invention.

For illustrative purposes in understanding the present invention, a suitable substrate or base lens body is illustrated in FIGURE 1. Observe that the surface of such body has a plurality of surface imperfections therein caused, for example, not only by method of manufacture but also by environmental factors. When the surface of such body has been coated with a copolymer as described herein, one typically obtains an exposed surface such as illustrated in FIGURE 2. Observe that the new exposed surface is free from the imperfectionsi associated with the uncoated exposed surface of the base lens body of FIGURE 1.

Observe that the exposed copolymer surface uniformly refracts incident light rays striking thereagainst because the index of refraction of the copolymer coating is matched to the index of refraction of the base surface, imperfections are optically dissolved, and light rays therefore no longer are bent at the point of optical imperfections in the base optical element but instead after entering the composite structure at a given point on the exposed surface of the copolymer layer proceed to pass through the optical element body without further change in direction.

In addition to elimination of surface imperfections and improvement in surface resistance to environmental influences, as indicated above, the copolymer coated optical elements of this invention have useful and important reflectance properties. For example, because the index of refraction approximates that of the base, no light reflection loss occurs at the interface between the copolymer coating and the base substrate. Of course, variation in reflectance properties can be effected by controlling copolymer coating variables, including thickness, composition, etc. as respects a given base material.

This invention is further illustrated by the following illustrative, but non-limiting examples:

EXAMPLE 1

To coat a polymethylmethacrylate lens body having an index of refraction of about 1.49, the following two monomer mixtures are prepared using Equation 2 above to determine the respective quantities of each monomer.

Mixture A 88 parts by weight tetraethylene glycol dimethacrylate (homopolymer refractive index approximately 1.51; monomer density of 1.07 at 22° C.)

0.5 part by weight benzoyl peroxide (initiator)

Mixture B 12 parts by weight 1,1-dihydroperfluorobutyl methacrylate (homopolymer refractive index approximately 1:38; monomer density 1.37 at 22° C.)

0.5 part by weight dimethyl para toluidine (promoter)

Mixtures A and B are combined just prior to use and flow coated in an oxygen-free atmosphere under slight positive pressure upon such polymethylmethacrylate lens body. The coated film is allowed to remain in the same oxygen-free atmosphere at room temperature (25° C.) for 3 to 5 minutes during which time polymerization occurs and a resulting thermoset, transparent coating having an index of refraction matching that of the lens body is formed thereon. Surface scratches on the resulting coated optical element are optically dissolved by the coating.

The resulting coated lens is then conventionally ground and polished on commercial glass finishing equipment using 5 micron aluminum oxide for grinding and titanium dioxide for polishing. The resulting lens displays no surface irregularities and is completely transparent.

In a similar fashion, coatings on similar lens bodies are also prepared from a mixture of tetraethylene glycol dimethacrylate with 1,1-dihydroperfluorohexyl methacrylate and from a mixture of ethylene glycol dimethacrylate with 1,1-dihydroperfluorooctyl methacrylate. After grinding and polishing in each instance, the resulting lens displays no surface irregularities and is completely transparent.

EXAMPLE 2

To coat a cellulose acetate butyrate film (approximate refractive index 1.48), the following mixtures are prepared using Equation 2 above to determine the respective quantities of each monomer.

Mixture A 79 parts by weight tetraethyleneglycol dimethacrylate (homopolymer refractive index approximately 1.51; monomer density 1.07 at 22° C.

0.5 parts by weight benzoyl peroxide (initiator)

Mixture B 21 parts by weight, 1,1-dihydroperfluorobutyl methacrylate (homopolymer refractive index approximately 1.38; monomer density 1.37 at 22° C.)

0.5 part by weight dimethyl para toluidine (promoter)

The mixtures A and B are combined and used as in Example 1 to coat such cellulose acetate butyrate film. A resulting thermoset, transparent coating having an index of refraction matching that of the base film is formed thereon.

Several coatings are prepared in this fashion varying in thickness from about 1 mil to 20 mils.

The coatings have refractive indices of approximately 1.49. The coatings thus produced are all transparent and thermoset. The extruded cellulose acetate butyrate base film, prior to coating, has on its surface extrusion scratches and surface imperfections. After coating, the surface irregularities are optically dissolved and the composite structure is competely transparent. The coated surface is polishable by the method described in Example 1 above.

EXAMPLE 3

To coat a cellulose acetate butyrate transparent blank whose refractive index is 1.48, the following two monomer mixtures are prepared using equation 2 above to determine the respective quantities of each monomer:

Mixture A 73 parts by weight of tetraethyleneglycol dimethacrylate (homopolymer refractive index approximately 1.51; monomer density 1.07 at 22° C.)

0.5 part by weight benzoyl peroxide (initiator)

Mixture B 27 parts by weight N-ethyl perfluorooctanesulfonamidoethyl methacrylate (homopolymer refractive index approximately 1.40; monomer density 1.58 at 22° C.)

0.5 part by weight dimethyl para toluidine (promoter)

Mixtures A and B are combined just prior to use and flow-coated in an oxygen-free atmosphere under slight positive pressure upon such extruded cellulose acetate butyrate blank. Since the fluorine-containing monomer is difficultly soluble at room temperature in the hydrocarbon methacrylate, the temperature of the monomer mixture, and the temperature of the coating environment, is uniformly maintained above about 35° C. Coating is performed immediately after mixing. A transparent polishable coating on the blank results. Surface imperfections initially on the blank are no longer optically detectable.

What is claimed is:

1. A transparent coated solid optical element whose coated surfaces can be polished and are free from optical defects, said optical element comprising, in combination, a preformed solid transparent base, and a layer on at least one face of said element composed of transparent, thermoset acrylic polymer of at least one fluorine-free acrylic monomer and at least one fluorine-containing acrylic monomer, said acrylic polymer containing sufficient fluorine to produce in such polymer an index of refraction which is about that of said optical element.

2. The element of claim 1 where said base is an organic thermoplastic polymer.

3. The element of claim 1 wherein the index of refraction both of said base and of said layer ranges from about 1.46 to 1.50.

4. The element of claim 1 wherein said fluorine is derived from 1,1-dihydroperfluorobutyl methacrylate.

5. The element of claim 1 wherein said fluorine is derived from 1,1-dihydroperfluorohexyl methacrylate.

6. The element of claim 1 wherein said fluorine is derived from 1,1-dihydroperfluorooctyl methacrylate.

7. The element of claim 1 wherein said fluorine is derived from N-ethyl perfluorooctane-sulfonamidoethyl methacrylate.

8. A process for making a transparent coated solid optical element comprising the steps of:
   (a) wetting at least one surface of a preformed solid optical base with a layer consisting of a polymerizable single phase liquid mixture containing a fluorine-free acrylic monomer and a fluorine-containing acrylic monomer, the ingredients of such mixture being in such proportions as to provide a polymer having an index of refraction which approximates that of the optical base, and then
   (b) polymerizing said mixture on said optical base to produce a transparent, thermoset solid coating having an index of refraction which approximates that of said optical base.

9. The process of claim 8 wherein said fluorine-free acrylic monomer comprises tetraethylene glycol dimethacrylate.

10. The process of claim 8 wherein said fluorine containing acrylic monomer comprises 1,1-dihydroperfluorobutyl methacrylate.

11. The process of claim 8 wherein said fluorine containing acrylic monomer comprises 1,1-dihydroperfluorohexyl methacrylate.

12. The process of claim 8 wherein said fluorine containing acrylic monomer comprises 1,1-dihydroperfluorooctyl methacrylate.

13. The process of claim 8 wherein said fluorine containing acrylic monomer comprises N-ethyl perfluorooctanesulfonamidoethyl methacrylate.

References Cited

UNITED STATES PATENTS

| | | | |
|---|---|---|---|
| 2,311,613 | 2/1943 | Slayter | 117—126 |
| 2,571,687 | 10/1951 | Dickey et al. | 260—86.1 |
| 2,803,615 | 8/1957 | Ahlbrecht et al. | 117—161 X |
| 3,042,542 | 7/1962 | Anders | 117—33.3 |
| 3,068,187 | 12/1962 | Bolstad et al. | 117—138.8 X |
| 3,081,192 | 3/1963 | Idelson | 117—145 X |
| 3,282,905 | 11/1966 | Fasick et al. | 117—124 X |
| 3,097,106 | 7/1963 | Blout et al. | 117—138.8 X |
| 3,384,627 | 5/1968 | Anello et al. | 117—145 X |

WILLIAM D. MARTIN, Primary Examiner

D. COHEN, Assistant Examiner

U.S. Cl. X.R.

117—64, 124, 145, 161